W. H. & C. W. TERPENING.
Lamp Extinguisher.

No. 93,565. Patented Aug. 10, 1869.

United States Patent Office.

WILLIAM H. TERPENING AND CLINTON W. TERPENING, OF GENESEO, ILLINOIS.

Letters Patent No. 93,565, dated August 10, 1869.

IMPROVEMENT IN LAMP-EXTINGUISHERS.

The Schedule referred to in these Letters Patent and making part of the same.

*To all whom it may concern:*

Be it known that we, WILLIAM H. TERPENING and CLINTON W. TERPENING, of Geneseo, in the county of Henry, and in the State of Illinois, have invented certain new and useful Improvements in Lamp-Burners; and do hereby declare that the following is a full, clear, and exact description thereof, reference being had to the accompanying drawing, making a part of this specification, in which—

Letters of like name and kind refer to like parts in each of the figures.

Our invention belongs to a class of devices used for extinguishing the flame of a coal-oil lamp, by covering the end of the wick-tube, so as to smother the flame; and It consists in the peculiar construction of the extinguisher, and in its manner of operation, as is hereinafter fully described.

In the annexed drawing—

A represents the burner, of usual construction, having a wick-tube, B, passing vertically through its centre.

C C represent the extinguisher, made in two sections, each of which is formed of a rectangular-shaped piece at its upper end, from which a stem, c, one-fourth of an inch wide, extends downward.

Figure 1:
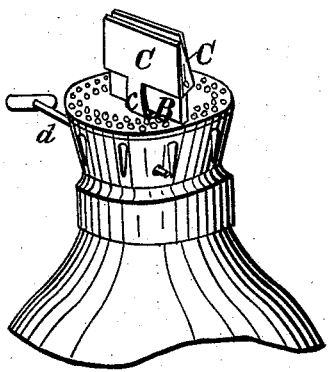
Figure 1 is a perspective view of our improved burner.
Figure 2:
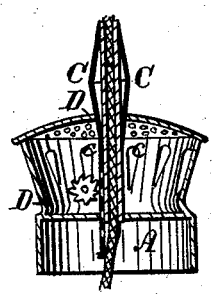
Figure 2 is a vertical central section of the same.

The vertical edges of the upper parts of the extinguisher are bent inward, at a right angle, enclosing the wick-tube, and are pivoted together, at their lower corners, as seen in fig. 1, so as to permit their upper edges to be spread apart or closed together, as may be desired.

The stems c and c' extend downward, beside the wick-tube, through suitable openings in the caps, where one of them, c', is provided with a series of perforations, which correspond with and receive the teeth of a star-wheel, D, working upon a horizontal shaft, d, so that, by turning said shaft, the stem, and consequently the extinguisher, are caused to slide up or down upon the wick-tube.

The lower end of the stem c' is bent outward, at a right angle, so as to furnish a stop, by means of which the extinguisher is prevented from being drawn out too far.

When thus constructed and arranged, the extinguisher is raised until its upper end is above the top of the tube, and the stems bent outward, so as to cause the upper edges of the sections to close together. If, now, the extinguisher be depressed, the sections will be forced apart by the upper end of the wick-tube, leaving said end entirely free, so that the wick may be lighted.

It will be readily seen, that if the extinguisher be raised, its upper edges will begin to close together as soon as they pass above the upper end of the wick-tube, and that, when entirely closed, the flame will be smothered, and smoke or disagreeable odor prevented.

The extinguisher can also be made useful in trimming the wick, as by raising the latter above the end of the wick-tube, and then raising the extinguisher, said wick will be firmly clasped between the upper edges of the sections, and enable the charred portions to be removed with great ease and precision.

Having thus fully set forth the nature and merits of our invention,

What we claim as new, and desire to secure by Letters Patent, is—

As a new article of manufacture, the within-described extinguisher, consisting of the sections C and C, stems c and c', star-wheel D, and shaft d, all constructed and arranged to operate substantially as and for the purpose shown.

In testimony that we claim the foregoing, we have hereunto set our hands, this 10th day of June, 1869.

WM. H. TERPENING.
CLINTON W. TERPENING.

Witnesses:
L. C. CAMPBELL,
JOHN G. HALL.